United States Patent [19]

Phillips et al.

[11] Patent Number: 5,121,054

[45] Date of Patent: * Jun. 9, 1992

[54] METHOD ND APPARATUS FOR DETERMINING THE ANGULAR VELOCITY OF A SHAFT USING A PAIR OF PROXIMITY SENSORS

[75] Inventors: Edward H. Phillips, Middletown, Calif.; David W. Shortt, Farmington Hills, Mich.

[73] Assignee: Techco Corporation, New York, N.Y.

[*] Notice: The portion of the term of this patent subsequent to Oct. 22, 2008 has been disclaimed.

[21] Appl. No.: 534,437

[22] Filed: Jun. 6, 1990

[51] Int. Cl.$^5$ .......................... G01P 3/42; G01P 3/48; G01P 3/54; G01B 7/14

[52] U.S. Cl. .................................... 324/160; 324/173; 324/207.11; 324/207.14; 324/207.25

[58] Field of Search ...................... 324/207.11, 207.13, 324/207.14, 207.15, 207.16, 207.17, 207.22, 207.23, 207.24, 207.25, 207.26, 160, 173, 174; 340/870.31

[56] References Cited

U.S. PATENT DOCUMENTS 4,181,884  1/1980  Shirasaki et al. ............ 324/207.25
4,752,732  6/1988  Van Scholack et al. ............ 324/236
5,059,900  10/1991  Phillips ............ 324/160

Primary Examiner—Walter E. Snow
Attorney, Agent, or Firm—Harness, Dickey & Pierce

[57] ABSTRACT

A tachometer particularly adapted for operation as a rotational velocity feedback transducer is provided. First and second proximity detectors are used to monitor orthogonal positions of an irregular surface portion of a rotating shaft and provide x and y signals that are substantially in quadrature. The x and y signals are differentiated with respect to time to provide differential signals that are representative of dx/dt and dy/dt, respectively. Signals representative of products x dy/dt and y dx/dt are generated from the x signal and the differential signal dy/dt, and the y signal and the differential signal dx/dt, respectively. A signal representative of algebraic sum x dy/dt—y dx/dt is generated from the signals representative of products x dy/dt and y dx/dt. A signal representative of quotient of (x dy/dt—y dx/dt) divided by the displacement r$^2$ of the irregular surface portion is generated from the signal representative of algebraic sum (x dy/dt—y dx/dt) which signal is representative of the rotational velocity of the rotating shaft.

15 Claims, 3 Drawing Sheets

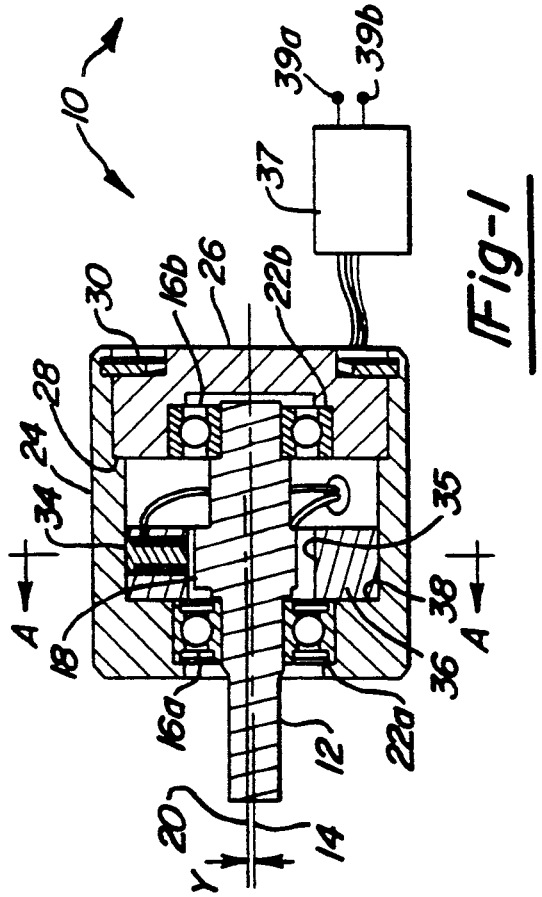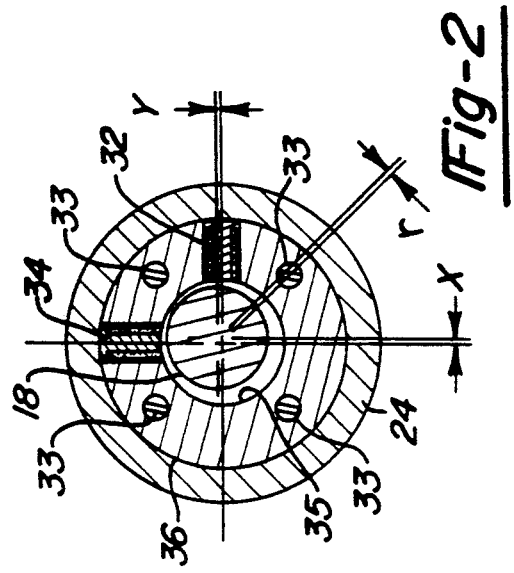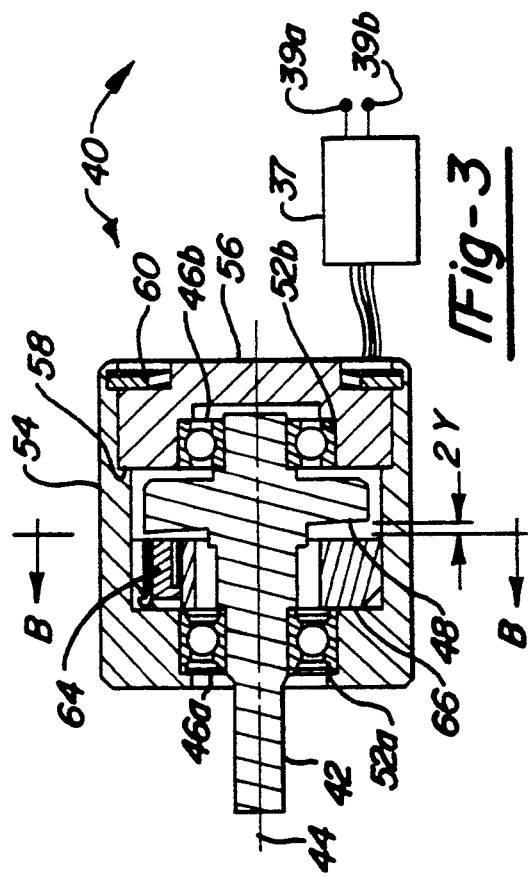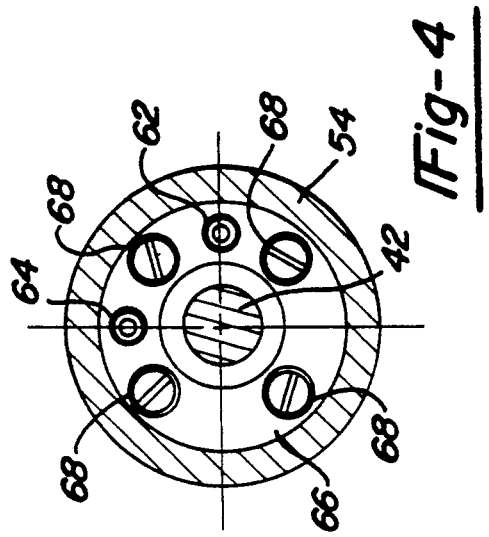

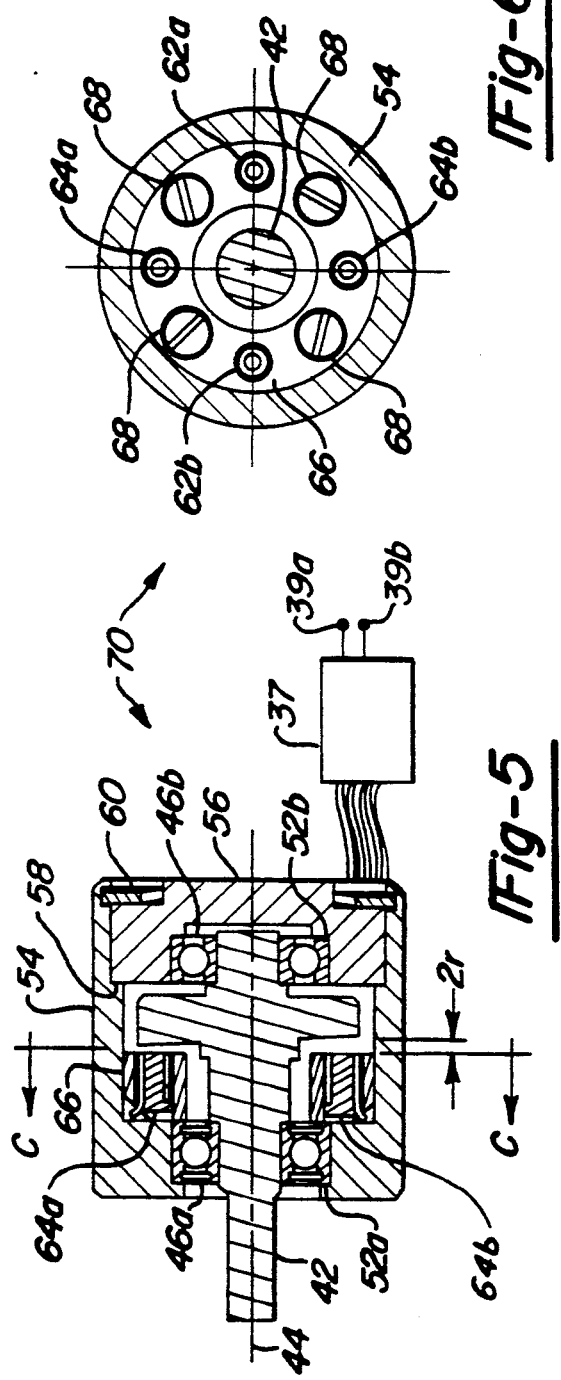
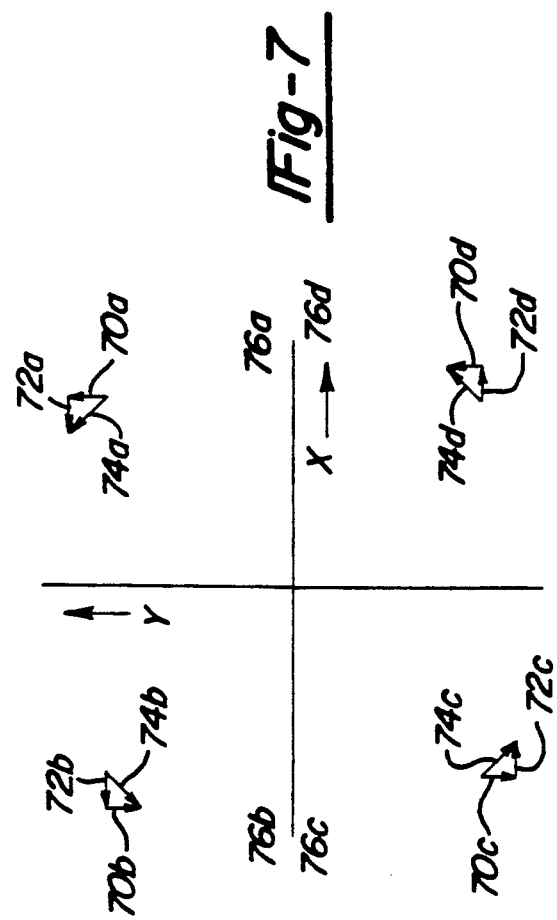

DERIVE A SIGNAL REPRESENTATIVE OF THE ROTATIONAL VELOCITY OF AN INPUT SHAFT OF A TACHOMETER

MEASURE x AND y

GENERATE DERIVATIVES dx/dt AND dy/dt

GENERATE PRODUCTS x dy/dt AND y dx/dt

GENERATE ALGEBRAIC SUM (x dydt - y dx/dt)

GENERATE QUOTIENT ( xdy/dt - y dx/dt)/$r^2$

METHOD ND APPARATUS FOR DETERMINING THE ANGULAR VELOCITY OF A SHAFT USING A PAIR OF PROXIMITY SENSORS

BACKGROUND AND SUMMARY OF THE INVENTION

The present invention relates generally to tachometers commonly utilized in electronically controlled servo systems.

Tachometers typically generate a signal (i.e. voltage or frequency) which is substantially proportional to its input shaft rotational velocity. Tachometers are often utilized in electronically controlled servo systems, either as feedback transducers for velocity servomechanisms or as feedback transducers in derivative feedback compensators for position servomechanisms. Such servomechanisms, and their system applications are explained in considerable detail in a book entitled FEEDBACK AND CONTROL SYSTEMS by Di Stefano III, Stubberud and Williams, and published as one of Schaum's Outline Series in Engineering by the McGraw-Hill Book Company of New York.

Conventionally, tachometers include an armature rotating within a fixed permanent magnet field such that voltage generated as a back emf is extracted (i.e., sensed) via a commutator-brush assembly. Unfortunately, the commutator-brush assembly detracts from the performance of such a tachometer because of brush drag and electronic noise as well as other related hysteresis effects. Thus, brushless tachometers utilizing a rotating permanent magnet field and a fixed armature are often used in applications which mandate superior performance. Generally, brushless tachometers are considered superior to brush-type tachometers. However, because brushless tachometers typically have fewer armature windings, they often have greater output voltage ripple.

Accordingly, the present invention is a greatly simplified tachometer which has no armature and therefore no commutator-brush assembly nor solid state switching arrangement. The simplified tachometer is environmentally stable, has a substantially reduced output voltage ripple and can be constructed with extremely low values of rotational inertia if desired.

In particular, the simplified tachometer of the present invention includes an eccentric or other sinusoidally undulating surface formed upon an input shaft whose rotational velocity is to be monitored. Proximity transducers are located within a housing in a quadrature arrangement. The proximity transducers are used to measure co-ordinate displacements x and y of the center of the eccentric with respect to the axis of rotation of the input shaft. The center of the eccentric is offset with respect to the axis of rotation of the input shaft by r, where r is equal to $(y^2+x^2)^{0.5}$. Since rotational position $\theta$ is equal to $\tan^{-1}(y/x)$, rotational velocity $d\theta/dt$ is equal to $[1/(1+(y/x)^2)]d(y/x)/dt$. This expression can be arithmetically simplified to $d\theta/dt=[x\, dy/dt - y\, dx/dt]/(y^2+x^2)$. Since $r^2=(y^2+x^2)$, this can be further simplified to $d\theta/dt=[x\, dy/dt - y\, dx/dt]/r^2$.

No further mathematical manipulation is required because both of the terms $x\, dy/dt$ and $y\, dx/dt$ are the product of two terms which preserve their algebraic signs. Thus, the entire expression is a "sign" and "magnitude" correct representation of the rotational speed of the input shaft.

Various other objects and advantages of the present invention will become more apparent to one skilled in the art from reading the following specification taken in conjunction with the appended claims and the following drawings.

BRIEF DESCRIPTION OF THE DRAWINGS

FIG. 1 is a longitudinal cross-sectional view of an improved tachometer according to a first embodiment of the present invention;

FIG. 2 is a cross-sectional view taken along line A—A of FIG. 1.

FIG. 3 is a longitudinal cross-sectional view of an improved tachometer according to a second embodiment of the present invention;

FIG. 4 is a cross-sectional view taken along line B—B of FIG. 3;

FIG. 5 is a longitudinal cross-sectional view of an improved tachometer according to a third embodiment of the present invention;

FIG. 6 is a cross-sectional view taken along line C—C of FIG. 5;

FIG. 7 is a diagrammatical illustration which depicts differential vectors dy/dt and dx/dt yielding positive values for $d\theta/dt$ in each of the first, second, third and fourth quadrants of the exemplary x-y plot;

DETAILED DESCRIPTION OF THE PREFERRED EMBODIMENTS

Figures 8, 9:
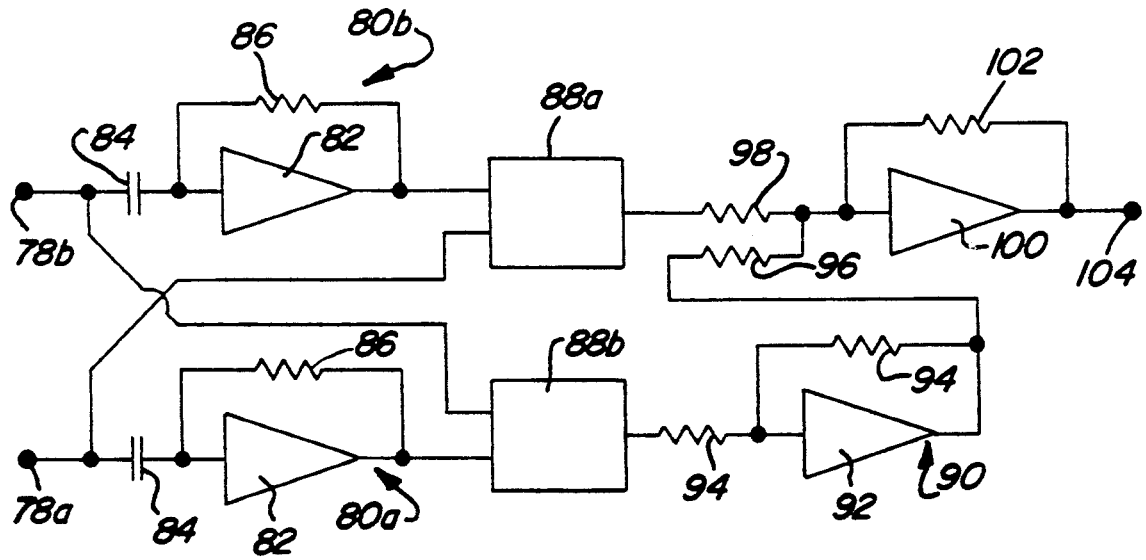
FIG. 8 is a flow chart outlining a method of deriving a signal representative of the rotational velocity $d\theta/dt$ of an input shaft associated with each of the improved tachometers of the present invention.
FIG. 9 is an equivalent analog circuit utilized in performing the computations embodied in the flow chart of FIG. 8.

With reference to the drawings, FIGS. 1 and 2 are longitudinal and diametral section views, respectively, of a tachometer 10 according to one embodiment of the present invention. In particular, an input shaft 12 is driven rotationally about a center line 14 by a device (not shown) whose rotational speed is to be measured. The input shaft 12 is constrained to rotate about the center line 14 by bearings 16a and 16b. An eccentric 18 is formed upon the input shaft 12. The eccentric 18 is formed about an offset center line 20 which is parallel to and located a radial distance "r" from the center line 14 of the input shaft 12. The bearings 16a and 16b are positioned in cavities 22a and 22b, respectively, which are formed in a housing 24 and cover 26, respectively. The cover 26 is positioned concentrically within the housing 24 against a shoulder 28 and is retained thereagainst by a fastener, such as bowed retaining ring 30.

First and second proximity transducers 32 and 34 (such as those manufactured by Kaman Instrumentation Corporation of Colorado Springs, CO), respectively, are located with a 90 degree included angle therebetween (i.e., in quadrature relationship one to another). The proximity transducers 32 and 34 are positioned in a transverse plane to center line 14 at a substantially uniform radial distance therefrom within a detector mount 36. Detector mount 36 is retained in abutting engagement with shoulder 38 provided in the housing 24 as by screws 33. Detector mount 36 has a cylindrical aperture 35 within which eccentric 18 is positioned.

According to the present invention, the first and second proximity transducers 32 and 34 are operated in a substantially linear mode to measure offset dimensions x and y, respectively. In particular, the dimensions x and y are used to indicate the particular rotational location "$\theta$" of the offset center line 20 with respect to the center line 14. Thus, the radial distance r is nominally equal to $(y^2+x^2)^{0.5}$.

The first and second proximity transducers 32 and 34 may be of any suitable type. For instance, inductive and capacitive proximity detectors are two particular transducer types that are suitable for application to the improved tachometer 10. As is known, detector systems utilizing such proximity transducers typically include a signal conditioning device or circuit which is schematically indicated as block 37 such that analog signals representative of the dimension x and y are located at terminals 39a and 39b.

With reference now to FIGS. 3 and 4, an alternative structural embodiment of the present invention is disclosed. More specifically, FIGS. 3 and 4 are longitudinal and diametral section views, respectively, of a tachometer 40. An input shaft 42 is driven rotationally by a device (not shown) whose rotational speed is to be measured. The input shaft 42 is constrained to rotate about a center line 44 with minimal axial cam action by bearings 46a and 46b. A sinusoidally undulating, transversely extending surface 48 is formed upon the input shaft 42. The sinusoidal surface 48 is formed with an axial peak-to-peak undulation amplitude of 2r. Again, "r" is nominally equal to $(y^2+x^2)^{0.5}$. The bearings 46a and 46b are positioned in cavities 52a and 52b, respectively, which are formed in a housing 54 and 56, respectively. The cover 56 is positioned concentrically within the housing 54 against a shoulder 58 and is retained thereagainst by a fastener, such as a bowed retaining ring 60.

First and second proximity transducers 62 and 64, respectively, are located with a 90 degree included angle therebetween (i.e., in quadrature relationship one to another). The proximity transducers 62 and 64 are positioned in a plane that is substantially orthogonal to the center line 44 within a detector mount 66 which is retained in the housing 54 by screws 68. Furthermore, the proximity transducers 62 and 64 are aligned axially in generally facing relation with respect to surface 48. As previously described, the first and second proximity transducers 62 and 64 are operated in a substantially linear mode to measure offset dimensions x and y, respectively. The dimensions x and y indicate a particular rotational location "$\theta$" of the sinusoidal surface 48.

According to a third structural embodiment, operation of a tachometer 70 can be enhanced by utilizing pairs of diametrically opposed proximity transducers 62a and 62b, and 64a and 64b, as is shown in FIGS. 5 and 6. More particularly, nominally redundant proximity transducers 62b and 64b are each mounted in diametrically opposed orientation relative to the proximity transducers 62a and 64a, respectively. In one preferred method of operation, output signals of the nominally redundant proximity transducers 62b and 64b are subtracted from output signals of the corresponding proximity transducers 62a and 64a, respectively, to yield signals of doubled magnitude which are more nearly linear. In addition, any common mode input to the proximity transducers due to axial play in the interface between the input shaft 42 and the bearings 46a and 46b is negated because of the algebraic summing of the output signals of the proximity transducers 62b and 64b with the corresponding output signals of the proximity transducers 62a and 64a, respectively, as described above.

Relatively failsafe operation is obtained by comparing the individual signal from each of the four proximity detectors with half of its corresponding doubled signal. If the individual signal deviates excessively, a diagnostic output signal will indicate that tachometer 70 is defective.

Each of the proximity transducer arrangements herebefore described generate signals which are representative of offset dimensions x and y. For positive values of x, the rotational position $\theta$ is indicated by:

$$\theta = \tan^{-1}(y/x) \quad (1)$$

The desired rotational velocity $d\theta/dt$ can be found by:

$$d\theta/dt = [1/(1+(y/x)^2)]d(y/x)/dt \quad (2)$$

This expression can be algebraically simplified to yield:

$$d\theta/dt = (x\, dy/dt - y\, dx/dt)/(x^2+y^2) \quad (3)$$

Since $(x^2+y^2)$ is nominally equal to $r^2$, this expression can be further simplified to a final form where:

$$d\theta/dt = (x\, dy/dt - y\, dx/dt)/r^2 \quad (4)$$

The expression $\theta = \tan^{-1}(y/x)$ is valid for positive values of x only. However, the expression $d\theta/dt = (x\, dy/dt - y\, dx/dt)/r^2$ includes the product terms $x\, dy/dt$ and $y\, dx/dt$ each of which are sign correct for all four quadrants (i.e., in the first quadrant x is positive and y is positive; in the second quadrant x is negative and y is positive; in the third quadrant x is negative and y is negative; and in the fourth quadrant x is positive and y is negative). This is illustrated in FIG. 7 which is a diagrammatic x-y plot depicting dy/dt vectors 70a, 70b, 70c and 70d, and dx/dt vectors 72a, 72b, 72c and 72d, which correspondingly yield positively valued $d\theta/dt$ resultant vectors 74a, 74b, 74c and 74d, respectively. As illustrated, the resultant vectors 74a, 74b, 74c and 74d are located in the first, second, third and fourth quadrants 76a, 76b, 76c and 76d, respectively, of the x-y plot of FIG. 7. In each case, the algebraic sum of the products x dy/dt and $(-)$ y dx/dt results in a positive value of $d\theta/dt$. For example, in the third quadrant 76c, both of the offset dimensions x and y have negative values while the dy/dt and dx/dt vectors 70c and 72c, respectively, have negative and positive values, respectively. Thus, the product x dy/dt has a sign value of $(-)(-)=(+)$ while the product y dx/dt, likewise has a sign value of $(-)(-)(+)=(+)$.

With reference not to FIG. 8, a flow chart is presented that outlines an exemplary procedure for deriving a signal that is representative of the rotational velocity $d\theta/dt$ for the input shaft associated with each tachometer 10, 40, and 70, each of which being constructed according to the various embodiments of the present invention hereinbefore described. This procedure is initialized by measuring displacements x and y via linear voltage signals from the first and second proximity transducers 32 and 34 of tachometer 10, the first and second proximity transducers 62 and 64 of tachometer 40, or the diametrically opposing pairs of first and second proximity transducers 62a and 62b, and 64a and 64b of tachometer 70. Next, the displacements x and y are differentiated with respect to time such that the derivatives dx/dt and dy/dt are generated. Thereafter, the products x dy/dt and y dx/dt are generated, from which the algebraic sum (x dy/dt − y dx/dt) is calculated. Finally, the quotient $(x\,dy/dt - y\,dx/dt)/r^2$ is generated to yield the desired tachometer output $d\theta/dt$.

If the above computation procedure is performed digitally via a microprocessor chip (not shown), which has been programmed according to the teachings described above, the tachometer output signal $d\theta/dt$ generated is valid for one particular instant in time. To generate a continuous tachometer output from such a microprocessor chip, the above described procedure is repeated at a refresh rate significantly higher than the operating band width of a parent control system (not shown). Since such refresh rates can exceed 1,000 Hz in servomechanism applications, the very simple calculation described above is a significant factor in enabling such continuous tachometer operation.

Alternately, continuous analog computation is possible as is illustrated in FIG. 9. In particular, FIG. 9 is a schematic diagram of a circuit adapted for performing the previously described computations in an analog manner. As such, the x and y measurement signals are applied to input terminals 78a and 78b, respectively. Signals representing the differentials of the x and y measurement signals with respect to time, dx/dt and dy/dt, are generated by differentiating circuits 80a and 80b, respectively, which each include an operational amplifier 82, capacitor 84 and resistor 86 configured in a known manner. Signals representing the products x dy/dt and y dx/dt are generated by multiplying chips 88a and 88b, respectively. (Suitable multiplying chips for this purpose can be obtained from Analog Devices of Wilmington, MA). The algebraic sign of the signal representing the product y dx/dt is inverted by an invertor circuit 90 which comprises operational amplifier 92 and two substantially equal valued resistors 94 configured in a known manner. The resulting inverted signal is summed with the signal representing the product x dy/dt via summing resistors 96 and 98, respectively, to generate a signal representing the algebraic sum (x dy/dt − y dx/dt). This signal is multiplied in a known manner by operational amplifier 100 and feedback resistor 102 to generate a signal representative of the desired quotient $(x\,dy/dt - y\,dx/dt)/r^2$ at output terminal 104.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A tachometer for measuring the angular velocity of a rotating device comprising:
   an input shaft coupled to the rotating device for rotation therewith about a first center line, said input shaft having a substantially sinusoidal undulation that is offset relative to said first center line; and
   first and second proximity detectors for sensing the proximity of said sinusoidal undulation such that output signals derived therefrom define x and y coordinate displacement signals that are indicative of the rotational location of said sinusoidal undulation with respect to said first and second proximity detectors, and wherein said first and second proximity detectors are oriented substantially in quadrature relation with respect to each other so as to define an included angle of about 90° therebetween, said output signals generated by said first and second proximity detectors being interfaced with signal manipulation means for deriving a signal that is indicative of the rotation velocity of said input shaft, said signal manipulation means differentiating said x and y signals with respect to time to generate differential signals dx/dt and dy/dt, said signal manipulation means generating product signals representative of the products x dy/dt and y dx/dt, and wherein said signal manipulation means thereafter generates a summation signal indicative of an algebraic sum x dy/dt − y dx/dt such that a quotient signal representative of the rotational velocity of said input shaft is generated from the quotient $(x\,dy/dt - y\,dx/dt)/r^2$ where $r^2 = x^2 + y^2$.

2. The tachometer of claim 1 wherein said sinusoidal undulation is a cylindrical eccentric formed on said input shaft having a second center line which is parallel to and offset from said first center line by an offset distance r where r is substantially equal to about $(x^2 + y^2)^{0.5}$.

3. The tachometer of claim 2 wherein said first and second proximity detectors are positioned at a predefined outwardly radial distance from said first center line, said first and second proximity detectors operable in a substantially linear mode for measuring said x and y displacement signals, respectively, upon rotation of said input shaft, and wherein said x and y displacement signals represent the angular location of said second center line with respect to said first center line.

4. The tachometer of claim 1 wherein said sinusoidal undulation is a generally sinusoidally undulating radially extending surface formed on said input shaft having a peak to peak amplitude of about 2r where r is substantially equal to about $(x^2 + y^2)^{0.5}$, and wherein said first and second proximity detectors are oriented to extend toward said undulating surface and are operable in a substantially linear mode for measuring said x and y displacement signals which represent the rotational location of said undulating surface relative to said proximity detectors.

5. The tachometer of claim 1 further comprising third and fourth proximity detectors wherein said third proximity detector is mounted diametrically opposite from said first proximity detector and said fourth proximity detector is mounted diametrically opposite from said second proximity detector whereby output signals from said third and fourth proximity detectors are subtracted from said output signals of said first and second proximity detectors, respectively, to yield resultant x and y output signals of doubled magnitude for increasing the linearity thereof.

6. The tachometer of claim 5 wherein said resultant x and y output signals are interfaced with signal manipulation means for generating a signal that is indicative of the rotational velocity of said input shaft.

7. The tachometer of claim 6 wherein said signal manipulating means differentiates said resultant x and y output signals with respect to time to generate differential signals dx/st and dy/dt, said signal manipulation means generating product signals representative of the products x dy/dt and y dx/dt, and wherein said signal manipulation means thereafter generates a summation signal indicative of an algebraic sum x dy/dt − y dx/dt such that a quotient signal representative of the rotational velocity of said input shaft is generated from the quotient $(x\,dy/dt - y\,dx/dt)/r^2$.

8. The tachometer of claim 7 wherein said signal manipulation means is a programmable microprocessor.

9. The tachometer of claim 7 wherein said differential signals dx/dt and dy/dt, products signals x dy/dt and y dx/dt, algebraic sum signal x dy/dt−y dx/dt and quotient signal (x dy/dt−y dx/dt)/$r^2$ are generated in an analog manner by:
  said differentials signals dx/dt and dy/dt being generated by differentiating said resultant x and y signals with respect to time via first and second differentiating circuits;
  said product signals x dy/dt and y dx/dt being generated by multiplying said resultant x signal and said differential signal dy/dt together with a first multiplying circuit, and multiplying said resultant y signal and said differential signal dx/dt together with a second multiplying circuit, respectively;
  said summation signal x dy/dt−y dx/dt being generated by inverting said signal representative of said product y dx/dt with an inverting amplifier, and summing said inverted signal representative of said product −y dx/dt with said product signal x dy/dt with first and second summing resistors; and
  said quotient signal (x dy/dt−y dx/dt)/$r^2$ being generated by multiplying said summation signal x dy/dt−y dx/dt by a factor substantially equal to 1/$r^2$ with an operational amplifier whose output is fed back with a feedback resistor.

10. A method of deriving a signal that is representative of the rotational velocity of a shaft comprising the steps of:
  forming a substantially sinusoidally undulating surface profile upon synchronous rotation of said shaft;
  measuring x and y signals substantially in quadrature that are representative of a rotational position of said substantially sinusoidally undulating surface;
  generating signals representative of differentials dx/dt and dy/dt from said x and y signals, respectively;
  generating signals representative of the products x dy/dt and y dx/dt from the x signal and said differential signal dy/dt, and the y signal and the differential signal dx/dt, respectively; and
  generating a summation signal representative of an algebraic sum x dy/dt−y dx/dt from the product signals x dy/dt and y dx/dt.

11. The method of claim 10 comprising the additional step of generating a quotient signal from said algebraic sum x dy/dt−y dx/dt divided by a signal substantially representative of the quantity $r=(x^2+y^2)^{0.5}$, said quotient signal being indicative of the rotational velocity of said shaft.

12. A method of deriving a signal that is representative of the rotational velocity of a shaft comprising the steps of:
  forming a substantially sinusoidally undulating surface profile upon synchronous rotation of said shaft;
  measuring x and y signals substantially in quadrature that are representative of a rotational position of said substantially sinusoidally undulating surface;
  generating digital signals representative of differentials dx/dt and dy/dt from said x and y signals, respectively;
  generating digital signals representative of the products x dy/dt and y dx/dt from the x signal and said differential signal dy/dt, and the y signal and the differential signal dx/dt, respectively; and
  generating a digital summation signal representative of an algebraic sum x dy/dt−y dx/dt from the product signals x dy/dt and y dx/dt.

13. The method of supplying a signal that is representative of the rotational velocity of a shaft of claim 12 comprising the additional step of generating a digital quotient signal of the algebraic sum x dy/dt−y dx/dt divided by a signal substantially representative of the quantity $r=(x^2+y^2)^{0.5}$, said quotient signal being indicative of the rotational velocity of said shaft.

14. The method of claim 13 comprising the additional step of repeating said method at a rate sufficient to provide a continuous quotient signal.

15. A method of deriving a signal that is representative of the rotational velocity of a shaft comprising the steps of:
  forming a substantially sinusoidally undulating surface profile upon synchronous rotation of said shaft;
  orienting first and second proximity detectors in quadrature with respect to said sinusoidally undulating surface;
  measuring first x and y coordinate displacement signals with said first and second proximity detectors, respectively;
  orienting third and fourth proximity detectors in quadrature with respect to said sinusoidally undulating surface, said third proximity detector being diametrically opposite said first proximity detector, said fourth proximity detector being diametrically opposite said second proximity detector;
  measuring second x and y signals with said third and fourth proximity detectors, respectively;
  subtracting said second x and y signals from said first x and y signals to yield resultant x and y signals of doubled magnitude for providing increased signal linearity;
  generating signals representative of differentials dx/dt and dy/dt from said resultant x and y signals, respectively;
  generating signals representative of products x dy/dt and y dx/dt from said resultant x signal and said differential signal dy/dt, and said resultant y signal and the differential signal dx/dt, respectively;
  generating a summation signal representative of an algebraic sum x dy/dt−y dx/dt from said product signals x dy/dt and y dx/dt, and
  generating a quotient signal from said algebraic sum x dy/dt−y dx/dt divided by a signal substantially representative of the quantity $r=(x^2+y^2)^{0.5}$, said quotient signal being indicative of the rotational velocity of said shaft.

* * * * *